United States Patent [19]

Guerder et al.

[11] 4,221,825

[45] Sep. 9, 1980

[54] CONTINUOUS PRODUCTION OF SYNTHETIC SILICA DOPED WITH FLUORINE

[75] Inventors: Pierre Guerder, Pithiviers; André Ranson, Rueil-Malmaison, both of France

[73] Assignee: Saint-Gobain Industries, Aubervilliers Cedex, France

[21] Appl. No.: 58,471

[22] Filed: Jul. 18, 1979

[30] Foreign Application Priority Data

Jul. 31, 1978 [FR] France .................. 78 22559

[51] Int. Cl.² ............. C03C 17/02; C03C 25/02; G02B 1/10
[52] U.S. Cl. ............................... 427/34; 65/3 A; 65/13; 65/60 D; 106/50; 106/52; 350/96.31; 350/96.34; 423/337; 427/163; 427/167
[58] Field of Search ............ 65/3 A, 60 D; 106/50, 106/52, 47 Q; 423/337; 427/163, 34, 167

[56] References Cited

U.S. PATENT DOCUMENTS

| | | | |
|---|---|---|---|
| 3,275,408 | 9/1966 | Winterburn | 423/337 |
| 4,045,198 | 8/1977 | Rau et al. | 65/60 D |
| 4,082,420 | 4/1978 | Shiraishi et al. | 350/96.31 |
| 4,125,389 | 11/1978 | King | 65/3 A |
| 4,135,901 | 1/1979 | Fujiwara et al. | 65/3 A |
| 4,161,505 | 7/1979 | Shiraishi et al. | 65/3 A |
| 4,162,908 | 7/1979 | Rau et al. | 427/34 X |
| 4,165,915 | 8/1979 | Rau et al. | 65/3 A |

FOREIGN PATENT DOCUMENTS 1029993 4/1978 Canada .
50-78595 6/1975 Japan ................. 423/337

OTHER PUBLICATIONS

Nassau, K. et al. "Lowloss Fused Silica Made by the Plasma Torch" Applied Optics–13(4) Apr. 1974.

*Primary Examiner*—Helen M. McCarthy
*Attorney, Agent, or Firm*—Pennie & Edmonds

[57] ABSTRACT

The present invention relates to a process for the continuous manufacture of vitreous synthetic silica doped with fluorine. This process consists of decomposing a silicon compound free of hydrogen in the flame of an inductive plasma burner, thereby forming silica upon reacting with the oxygen contained in the burner feed gas. A gaseous inorganic fluorine compound free of hydrogen, is sent into the flame preferably from outside the burner. Said fluorine compound simultaneously with the silicon compound decomposes whereby fluorine is introduced into the silica, lowering its index of refraction. The doped silica is then deposited on a heat-stable support in the form of a vitreous mass. The doped synthetic silica is particularly useful for making preforms for optical transmission fibers.

6 Claims, 1 Drawing Figure

U.S. Patent  Sep. 9, 1980  4,221,825
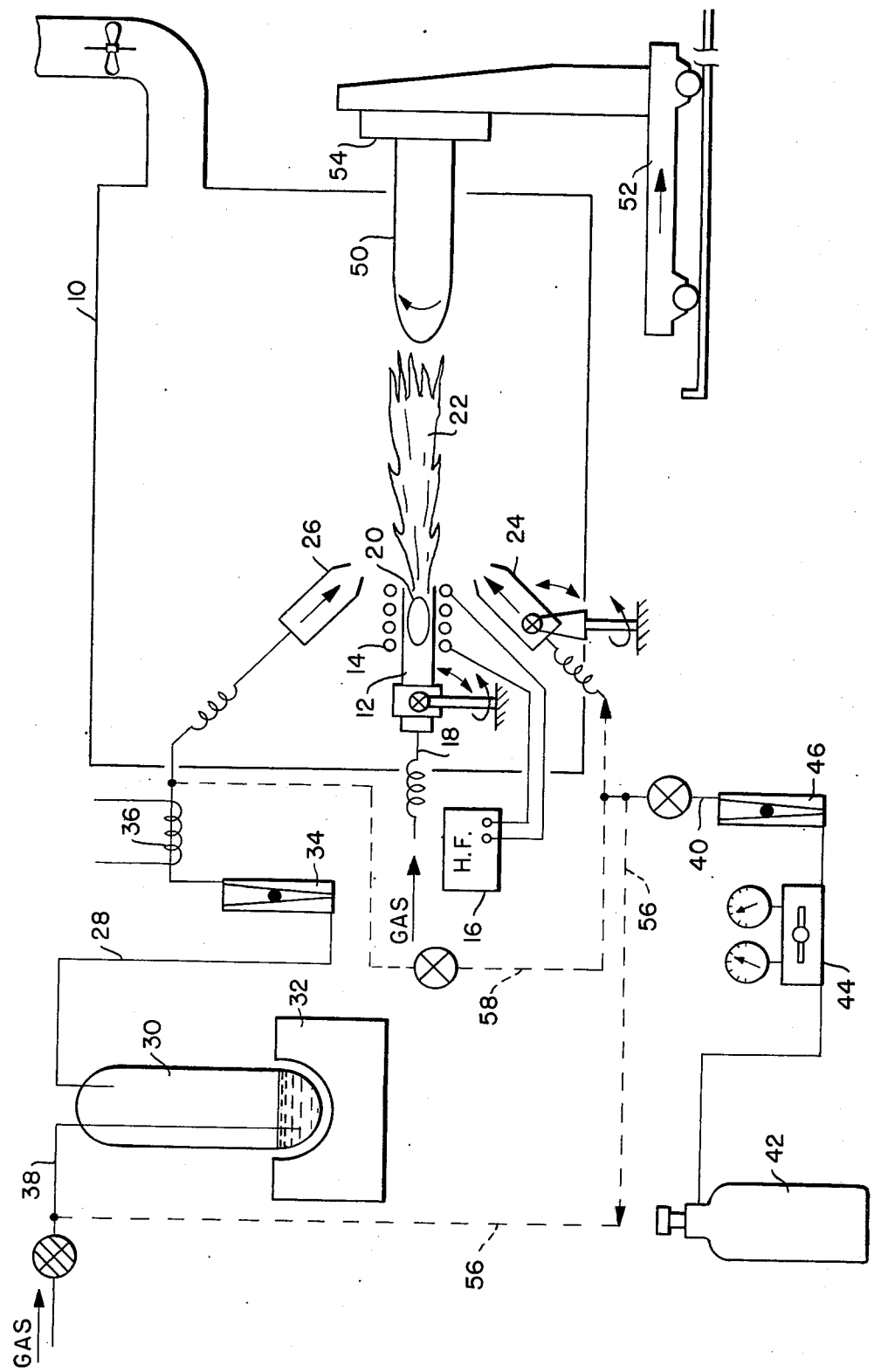

CONTINUOUS PRODUCTION OF SYNTHETIC SILICA DOPED WITH FLUORINE

DESCRIPTION

1. Technical Field

The present invention relates to a process for continuous manufacture of synthetic silica which is particularly useful for making preforms for optical transmission fibers.

2. Background Art

Various methods have been employed in the prior art in forming optical fibers having a core of very high purity synthetic silica which is coated with a material to form a sheath. The sheath material possesses a slightly different index of refraction in order to effect proper optical transmission properties to the core. In particular, synthetic silica doped with fluorine is recognized as a suitable coating material.

A layer of silica glass doped with fluorine may be deposited on a rod or tube of molten silica as described in French Pat. No. 2,208,127. Gaseous silica fluoride, $SiF_4$, is distributed around a rod moved by means of a double movement of rotation and translation. Upon being heated by an oxyhydrogen blowpipe, the $SiF_4$ reacts with either the hydrogen and the oxygen of the water vapor which is present, or with this vapor itself to form fluorine-doped silica. This process, however, only introduces minor amounts of fluorine in the silica layer that is formed. Furthermore, the presence of hydrogen or water vapor creates a disadvantage in that the doped silica exhibits absorption bands whose wavelengths are characteristic of hydroxyl (OH) ions.

On the other hand, French Pat. No. 2,321,459 describes a process of preparing vitreous synthetic silica ($SiO_2$) doped with fluorine and free of OH ions. The oxygen contained in a hydrogen-free gaseous current in the flame of an inductive plasma burner is reacted with a silicon compound, such as $SiCl_4$. The silica doping compound is an organic fluorine compound. Preferably dichlorodifluoromethane, $CCl_2F_2$, is added in the form of vapor to the oxygen introduced into the plasma burner. The $CCl_2F_2$ decomposes simultaneously with the formation of $SiO_2$. The vitreous mass of doped silica is then deposited on the surface of a silica blank with a rotational movement.

DISCLOSURE OF INVENTION

In accordance with the present invention, a process for continuously manufacturing synthetic silica which is doped with fluorine and free of hydrogen ions is characterized by:

(I) decomposing a hydrogen-free silicon compound into the flame of an inductive plasma burner whereby the silicon compound reacts with the oxygen contained in the burner feed gas to form silica;

(II) introducing a gaseous, inorganic fluorine dopant which is one of the group of sulfur hexafluoride, nitrogen trifluoride or a mixture thereof into the burner flame wherein the dopant decomposes under heat and is free of hydrogen thereby lowering the index of refraction of synthetic silica; and (III) depositing a vitreous mass of silica on a heat stable support.

The preferred silicon compound is silicon tetrachloride, $SiCl_4$. Advantageously, both the silicon compound and the fluorine dopant are introduced into the plasma flame, outside of the burner, by means of separate nozzles. The high temperature of the flame leads to a thermal dissociation of a dopant such as either $NF_3$ or $SF_6$ which releases fluorine whose simultaneous presence in a flame having vaporized silica results in the depositing of a doped silica with a controlled fluorine content. Control of the fluorine content governs the index of refraction ($n_D$) of the ingot or preform. By modifying the ratio of the amounts of $NF_3$ and $SiCl_4$ simultaneously directed into the flame, a desired $n_D$ is achieved. Fluorine dopants such as $NF_3$ or $SF_6$ are more desirable than those of the prior art since they permit an increased rate of doped silica depositation. Significantly the total energy consumption for the process is reduced without lowering the transparent qualities of the final ingot. Although this surprising result is not yet entirely explained, it is assumed that the improvements offered by $NF_3$ or $SF_6$ dopants instead of an organic compound of the $CCl_2F_2$ type are due, in part, to the absence of carbon in the molecule of the fluorine compound, but also to both a greater proportion of fluorine molecules and a greater flame-dissociation ability. In addition, the organic $CCl_2F_2$ type compounds generally contain hydrogenated impurities such as $CHClF_2$ and $CH_2ClF$. Hence, the risk of introducing hydroxyl ions into the deposited silica is higher.

Another advantage offered by the invention is that at an equal deposit rate, a lesser amount of $SF_6$ or $NF_3$ is required to obtain an ingot of the same index of refraction. Reduction of the hourly delivery of $NF_3$ or $SF_6$ in turn permits a higher plasma flame temperature thereby increasing the growth rate and reducing the risk of localized defects which would lower the optical transparency of the ingots.

BRIEF DESCRIPTION OF DRAWINGS

The advantages, nature and various additional features of the invention will appear more fully upon consideration of the illustrative embodiment of the present process which is schematically set forth in the sole FIGURE of drawing.

BEST MODE FOR CARRYING OUT THE INVENTION

Referring to the sole FIGURE, a hood 10 protects the plasma flame which is adjustably supported as described herein. The burner supplying the plasma flame comprises a transparent silica tube 12 surrounded by an induction coil 14 which is electrically connected to a high-frequency generator 16. The silica tube has a closed end provided with a nozzle 18 through which a plasma generating gas such as air, nitrogen protoxide, pure oxygen or a mixture thereof, is introduced. As previously known, the plasma burner is started by first directing an argon gas current through nozzle 18 and then introducing a grounded metal rod into the field of the induction winding. As rapidly as possible the argon is replaced by a selected plasma generating gas. A plasma 20 occurs in the silica tube becoming a very high temperature "flame" 22 upon exiting the tube. A pair of nozzles 24 and 26 are placed on the outside of the plasma burner, preferably on each side of the silica tube 12, and angled towards the flame. One nozzle delivers a silicon compound such as silicon tetrachloride, $SiCl_4$, while the other delivers a fluorine doping gas, such as $SF_6$ or $NF_3$. Preferably the nozzles are fastened on a device which has a means for controlling the nozzle orientation, as shown for nozzle 24.

Nozzle 26 is connected by tubing 28 to an evaporator 30 containing silicon tetrachloride in the liquid state which is heated by a heating device 32. A flow meter 34 is placed along tubing 28 which is preferably surrounded by a heating resistor 36 to avoid condensation of the silicon tetrachloride, $SiCl_4$. The $SiCl_4$ vapors are entrained into the burner flame by a dry vector gas coming into evaporator 30 by means of tubing 38. The vector gas is preferably composed of oxygen but can also be nitrogen or argon if the plasma generating gas is very rich in oxygen, or a mixture of oxygen or air with an inert gas. If necessary, the vector gas is sent over a strong dessicant before being introduced into the $SiCl_4$ evaporator. The gaseous fluorine dopant arrives at nozzle 24 by means of a conduit 40 which is connected to a pressurized tank 42 containing $NF_3$ or $SF_6$, and is equipped with a reducing valve 44 and a flow meter 46.

The apparatus for the instant process also comprises a very pure vitreous silica blank 50 on which the doped silica is deposited. This blank is carried by a mobile support 52 which comprises a means for positioning the blank in front of the flame and moving it in a translational relation to the flame. Also, the blank is in rotation during the entire coating period by means of a mechanical mounting of a known type, i.e., a chuck 54. This rotation is necessary in order to obtain a cylindrical ingot of uniform diameter.

According to another embodiment, the vector gas entraining the $SiCl_4$ vapors in the plasma is either totally comprised of the gaseous fluorine dopant itself or contains a certain proportion thereof. The conduit 40 in which nitrogen trifluoride or sulfur hexafluoride circulates also comprises a branch 56 which is connected to tubing 38 upstream from the $SiCl_4$ evaporator 30. Thus, it is possible to send the dopant into the flame not only by nozzle 24, but also by nozzle 26 in a mixture with $SiCl_4$. Further, an additional branch 58 connects conduit 40 to tubing 28 downstream from evaporator 30. Again, a mixture of $SiCl_4$ and the fluorine dopant are introduced into the plasma except nozzle 24 is also now involved. These nozzles then form a crown around the plasma flame thereby resulting in a good distribution of coating material about the rotating silica core.

After the plasma burner has been started, the synthetic silica blank is heated, by the plasma flame until a very high surface temperature of about 2400° C. is reached. Entrained by the vector gas, the $SiCl_4$ vapors are then injected in the flame by nozzle 26 while gaseous $NF_3$ or $SF_6$ arrive by nozzle 24, either alone or in mixture with $SiCl_4$ as described above. In the presence of the plasma generating gas, which preferably contains only oxygen, silicon tetrachloride is decomposed under the very high temperatures and reacts with the oxygen to form silica ($SiO_2$). Considering these temperatures, the fluorine compound is essentially simultaneously decomposed while the $SiO_2$ is formed. Thus, fluorine is introduced into the synthetic silica which is regularly deposited on the blank in form of a transparent glass notably free of bubbles. It is important to have stable and invariable conditions in order to obtain a regular and uniform deposit. Consequently, it is necessary to keep the "growth front" of the ingot a constant distance from the plasma flame. Maintaining a constant temperature requires a progressive drawing of a mobile support 52 away from the nozzle as the length of the ingot increases. A device (not shown) for detecting the position of the ingot in relation to the plasma may be mounted to control the movements of the mobile support. This device, of known type, may be comprised of a photoelectric cell. The translational and rotational speed of the blank are regulated as a function of the following: the diameter of the ingot; the degree of homogeneity or desired product transparency; along with the hourly delivery of $SiCl_4$ and fluorine dopant. Too high an $SiCl_4$ content often runs the risk of a defective ingot, for example, from a deposit of $SiO_2$ in microbubble form. Excessive fluorine dopant, moreover, may reduce the growth rate.

The growth rate, index of refraction and principal parameters influencing the formation of an ingot or a preform of fluorine-doped silica are given in the following examples:

EXAMPLE 1

In the device described above, a blank is heated in rotation at a speed of 50 rpm by a plasma burner fed by pure oxygen. The $SiCl_4$ vapors entrained by the oxygen were sent into the flame by nozzle 26 at a delivery rate of 1800 grams per hour (g/h) of $SiCl_4$. Sulfur hexafluoride ($SF_6$) stored in the tank under pressure arrived simultaneously by nozzle 24 at a delivery rate of 300 g/h. Under these conditions a very uniformly shaped ingot was obtained that has a diameter of 90 mm and a weight of 20 kg at a growth rate that reached 150 g/h of $SiO_2$. Growth was very stable and the ingot, free of bubbles and hydroxyl (OH) ions, has an index of refraction of 1.453 (sodium ray D). The OH ion content was less than 5 ppm (parts per million).

EXAMPLE 2

The materials of example 1 were employed but the deliveries of $SiCl_4$ and $SF_6$ were, respectively, 1800 g/h and 600 g/h. The rotation speed of the blank was modified and fixed at 100 rpm thereby producing an ingot with a larger diameter. Again, an ingot of 20 kg was obtained, having a diameter of 105 mm, good transparency and uniform shape. The growth rate, however, was clearly higher, reaching 170 g/h. The index of refraction for the doped silica was 1.451 and the OH ion content was less than 5ppm.

EXAMPLE 3

By way of comparison, an ingot of silica doped with fluorine was formed with the same device but using dichlorodifluoromethane, $CCl_2F_2$ as the dopant. For a blank rotation speed of 100 rpm and a $CCl_2F_2$ delivery of 450 g/h, the $SiCl_4$ could be brought into the flame at a delivery rate of 1500 g/h. An ingot of 20 kg was produced at a growth rate of 145 g/h of $SiO_2$. The index of refraction $n_D$ was 1.453 but the coating did contain some bubbles. If an attempt were made to operate at $SiCl_4$ deliveries greater than 1500 g/h, the other parameters being kept constant, the rate of growth decreases. Silica was no longer continuously deposited on the ingot in the form of a transparent glass. Consequently, the ingot exhibited defects.

EXAMPLE 4

In the same device as for example 1, the $SiCl_4$ vapors entrained by oxygen were directed toward the pure oxygen plasma flame at a rate 1800 g/h. Gaseous nitrogen trifluoride was sent through nozzle 24 at a rate of 570 g/h. For a blank rotation speed of 100 rpm, the growth rate of the ingot rose to 195 g/h. In a week it was possible to obtain an ingot of very good quality weighing more than 20 kg, having a diameter of 110 mm, and an OH ion content of 1 ppm. The index of refraction was $n_D=1.450$.

EXAMPLE 5

A pure oxygen plasma was used as above, SiCl$_4$ was sent into the flame by using nitrogen trifluoride NF$_3$ as the vector gas. Nozzles 24 and 26 both served to direct a NF$_3$ and SiCl$_4$ mixture to the flame. The mixture was distributed by branch 56 between these two nozzles, so that the total amounts of SiCl$_4$ and NF$_3$ were 1800 g/h and 370 g/h respectively. With a rotation speed of the blank of 105 rpm, an ingot was formed with a diameter of 120 mm and weight 25 kg at a growth rate of 210 g/h. The index of refraction and OH ion content had values identical with those of the preceding example and although the growth rate was greater, the ingot exhibited an excellent transparency.

Increases in the growth rate with the resulting energy savings are clearly shown in relation to the prior art, (example 3). Unexpectedly, the instant ingots exhibit large dimensions and are free from bubbles or irregularities despite the high growth rate. The examples given above relate to the production of large diameter ingots. For ingots with smaller diameters, the axial growth rate is higher and is expressed in mm/hour. Of course, the risks of irregularities in the transparency of the ingots are reduced.

Instead of proceeding to an axial growth of snythetic silica ingots by withdrawing a blank 50 in relation to the flame, it is possible to obtain a radial growth by replacing the blank with a cylindrical rod which is subjected to both a rotational movement and a longitudinal movement angled towards the plasma flame. In this case, a sheath of synthetic silica doped with flourine is formed around a central rod, composed of pure synthetic silica, or synthetic silica previously doped with metal ions which increase the index of refraction. This embodiment of the present process permits a direct product whose core has an index of refraction greater than that of the covering sheath, and which can be drawn to form an optical fiber.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

We claim:

1. A process for continuously manufacturing synthetic silica which is doped with fluorine and has less than 5 parts per million hydroxyl ions comprising:
    (a) decomposing a hydrogen-free silicon compound, typically silicon tetrachloride, directed into the flame of an inductive plasma burner whereby the silicon compound reacts with the oxygen contained in the burner feed gas to form silica;
    (b) introducing a gaseous, inorganic fluorine dopant which is one of the group of sulfur hexafluoride, nitrogen trifluoride or a mixture thereof into the burner flame wherein the dopant decomposes under heat and is free of hydrogen thereby lowering the index of refraction of synthetic silica; and
    (c) depositing a vitreous mass of the doped silica on a heat stable support moved both in rotation and in longitudinal movement.

2. The process according to claim 1 wherein the fluorine dopant is introduced outside a plasma burner and angled towards the plasma flame.

3. The process according to claim 1 or 2 wherein the silicon compound is angled towards the flame.

4. The process according to claim 1 or 2 wherein the nitrogen trifluoride or sulfur hexafluoride is used as a vector gas for the silicon compound.

5. The process according to claim 1 or 2 wherein the silica formed in the plasma flame is deposited radially on a synthetic vitreous silica rod which is:
    (a) free of OH ions; and
    (b) moved in both a rotational and a longitudinal movement angled toward the plasma flame; thereby coating the rod with a sheath of vitreous, fluorine-doped silica which exhibits an index of refraction which is less than that of the rod.

6. The process according to claim 1 and 2 wherein either the fluorine dopant or the silicon compound are directed toward the plasma flame by one or more adjustable nozzles.

* * * * *